Dec. 26, 1961 J. F. SCHAFFNER 3,014,399
EXPANSION ANCHOR BOLT
Filed July 6, 1959
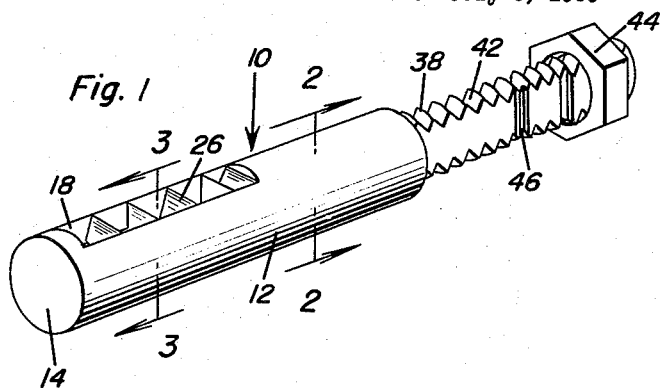
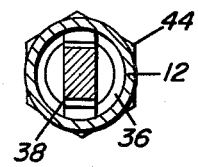
Fig. 2
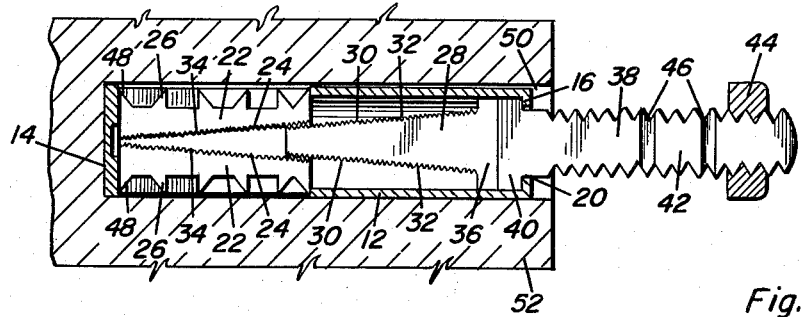
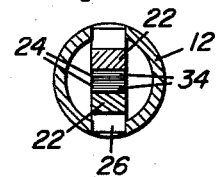
Fig. 3
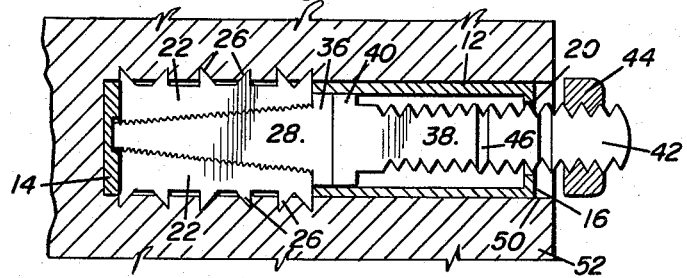
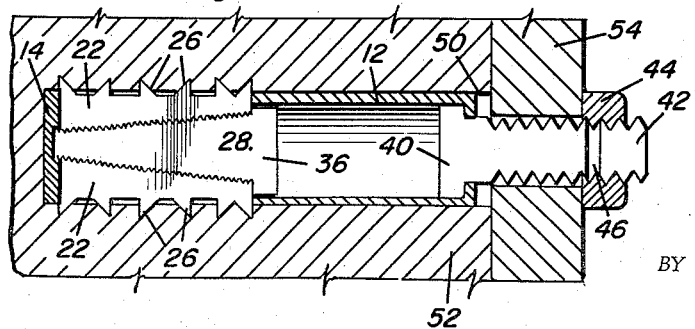
John F. Schaffner
INVENTOR.
BY *Clarence A. O'Brien*
*and Harvey B. Jacobson*
Attorneys

United States Patent Office 3,014,399
Patented Dec. 26, 1961

3,014,399
EXPANSION ANCHOR BOLT
John F. Schaffner, R.R. 1, Trempealeau, Wis.
Filed July 6, 1959, Ser. No. 825,333
4 Claims. (Cl. 85—2.4)

This invention relates to a new and useful expansion anchor bolt and more particularly to an anchor bolt which is adapted to be inserted in a bore formed in a supporting surface and frictionally retained therein by means of radially expanding anchor members, the anchor bolt being especially adapted for use with blind bores.

In many instances it is desired to secure an anchor bolt to an anchor member without forming a bore completely through the supporting member. There have been many forms of anchor bolts designed for the purpose of securing an object to a supporting surface, but most have failed in one respect in that they require the forming of a bore entirely through the supporting surface. In many instances the forming of a bore entirely through the supporting surface is not feasible either because the supporting member is of great thickness or because it is desired not to disform the opposite surface of the supporting member.

It is therefore the main object of this invention to provide an expansion anchor bolt which may be inserted and frictionally retained within a blind bore.

A further object, in accordance with the preceding object, is to provide a means whereby articles may be conveniently removably secured to the anchor bolt.

A still further object of this invention is to provide a means for ensuring that the expansion anchor bolt will remain in frictional engagement with the supporting surface to which it is applied.

A final object to be specifically enumerated herein is to provide an expansion anchor bolt which will conform to conventional forms of manufacture, be of sturdy construction, and easy to secure within a bore formed in a support member so as to be economically feasible, durable, and readily adaptable to many different environments.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a perspective view of the expansion anchor bolt shown with the threaded bolt thereof in an extended position;

FIGURE 2 is a vertical transverse sectional view taken substantially upon a plane indicated by the section line 2—2 of FIGURE 1;

FIGURE 3 is a vertical transverse sectional view taken substantially upon the plane indicated by the section line 3—3 of FIGURE 1;

FIGURE 4 is a longitudinal vertical sectional view of the expansion anchor bolt shown inserted within a blind bore formed in a support member with the anchor shown in a retracted position;

FIGURE 5 is a longitudinal vertical sectional view of the expansion anchor bolt like that of FIGURE 4 but with the anchors in the extended position and with the wedge positioned therebetween; and FIGURE 6 is a longitudinal vertical sectional view of the anchor bolt like that of FIGURE 5 but with the threaded bolt shown in an extended position and with the element being supported thereby by means of the threaded nut.

Referring now more specifically to the drawings the numeral 10 generally designates the expansion anchor bolt comprising the present invention which is composed of a generally hollow cylindrical case 12 having an inner end wall 14, an outer end wall 16, and a plurality of circumferentially disposed longitudinally extending slots 18 formed in the inner portion thereof. The inner end wall 14 extends entirely across the inner end of the case 12 while the outer end wall 16 has a non-circular opening 20 formed therein.

Slidably disposed in each slot 18 is an anchor 22 having an inclined inner edge 24 thereon. The anchors 22 are mounted for radial movement of the case 12 and have on their outer edges gripping elements 26 for a purpose to be hereinafter set forth.

Slidably disposed in the outer portions of the case 12 is a wedge 28 having a plurality of inclined wedge surfaces thereon, each being in alignment with and complementary to the inner edge of one of the anchors 22. The inclined wedge surfaces 30 are inwardly convergent towards the inner end of the case 12 and have a plurality of gripping elements 32 thereon which are adapted to engage the gripping elements 34 formed on the inner edge of each of the anchors 22.

With attention now drawn more particularly to FIGURE 4 of the drawings, it will be noted that the innermost end of the wedge 28 is interposed between the outer ends of the wedge elements 22 and that the head of the wedge 28 is provided with an enlarged portion 36.

Slidably disposed in the outermost portion of the case 12 is a bolt 38 having an enlarged head 40 thereon with a threaded shank portion 42 projecting through the opening 20. Threadedly engaged upon the outermost end of the threaded shank 42 is a threaded nut 44 whose purpose is to be hereinafter set forth. The threaded shank 42 is provided with a plurality of grooves 46 which adapt the bolts 38 to be conveniently cut at these points when it is desired to shorten the threaded shank 42. The confronting surfaces of the bolt 38 and the wedge 28 are in abutting contacting relation when the anchors 22 are in a recessed position within the case 12 and it will be apparent that the anchors 22 will be urged radially and outwardly of the case 12 upon the movement of the threaded shank 42 into the case 12.

To retain the anchors 22 in a recessed position within the case 12 when the anchor bolt 10 is not being used, a bead 48 of suitable material may be lightly fused at one or two points along the edge of each slot 18 to restrict the outward movement of the anchors 22 through slots 18.

In operation, after a blind bore 50 has been formed in the support member 52, the case 12 is inserted within bore as is shown in FIGURE 4 of the drawings and the nut 44 is backed off to the outer end of the threaded shank 42. The end of the threaded shank and the nut 44 may then be used as a hammer block which may be struck with a suitable implement such as a hammer (not shown) to wedge the wedge element 28 between the opposing inclined edges 24 of the anchors 22 to urge the latter radially and outwardly of the case 12 forcing the gripping elements 26 into engagement with the surfaces of the bore 50. It is to be understood that the element comprising the anchor bolt 10 will be constructed of a material rigid and strong enough to withstand substantial stresses so that the anchor 10 may be secured within support elements constructed of various materials. Further, it is to be understood that the gripping elements 26 will be so constructed and of such a size so as to adapt them to be readily engageable with the supporting element in which the anchor bolt is to be secured. That is to say, if the support element is constructed of wood, the gripping elements 26 could be constructed of relatively coarse saw tooth construction, whereas if the anchor bolt was to be secured in a relatively hard material such as metal, the gripping elements 26 would be constructed of very fine construction or perhaps only a serrated outer surface on each of the anchors 22. Still further, the confronting surfaces of the anchors 22 and the wedge 28 would preferably be serrated to insure that the wedge will remain in position between the anchors 22.

After the anchors 22 have been urged to the extended position engaging the walls of the bore 50, the bolt 38 may be withdrawn partially from the case 12 until the opposed surfaces of the enlarged portion 40 and the outer end wall 16 are in contacting relation whereupon the threaded shank 42 may be cut to a convenient length at the point of one of the notches 46 and have the article 54 which is to be supported retained in position against the supporting element 52 by means of the threaded nut 44.

It is to be understood that the non-circular opening 20 and the complement cross section of the threaded shank 42 will restrict the bolt 38 from rotating about its longitudinal axis when the threaded nut 44 is screwed into engagement with the article 54 which is to be supported. Further, although the anchor bolt shown in the drawing includes two circumferentially disposed anchors 22, it is to be understood that any convenient number of slots 18 may be formed in the case 12 and that a like number of anchors 22 may be provided with the corresponding inclined surfaces being provided on the wedge 38. Further, if it is desired to afford more support for the wedges 38 to resist lateral stresses, suitable guides or partitions (not shown) may be secured within the case 12 to guide or box in the wedges 38 to ensure that their movement will be limited to that which is radially of the case 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An expansion anchor bolt comprising a cylindrical bolt case adapted to have one end inserted in a bore formed in a supporting member, a plurality of circumferentially disposed longitudinally extending slots formed in said case adjacent said one end, a plurality of anchors each slidably disposed in one of said slots for extension and retraction through said slots, the inner surfaces of said anchors being inwardly convergent toward said one end, a wedge slidably disposed in said case adjacent the other end having inclined wedge surfaces thereon equal in number to, in alignment with and complementary to the inner surfaces of said anchors, means for forcing said wedge between said anchors toward said one end of said case whereby said anchors will move radially and outwardly of said case, means restraining retrograde movement of said anchors and said wedge, an end wall on said other end of said case having a non-circular opening therein, said forcing means comprising an elongated member having a shank with a cross-sectional shape complementary to said opening slidably received through said opening and free of permanent connection with said wedge but having one end for abutting engagement with the end of said wedge adjacent said other end of said case, an enlarged head portion formed on said one end of said elongated member of a size and shape preventing its withdrawal through said opening, the other end of said elongated member having means thereon adapted for engagement by a fastener and to have a hammer block removably secured thereto.

2. The combination of claim 1 wherein said elongated member comprises a bolt having a head defining said enlarged head portion and a threaded shank portion extending through said opening, a nut threadedly engaged on the extended portion of said shank whereby said nut may be positioned on the outer end of said block and used as a hammer block during the extending of said anchors and thereafter as a fastener when said member is withdrawn to a point with said enlarged head portion abutting the inner surface of said end wall.

3. The combination of claim 1 including means releasably carried by said case and said anchors preventing premature radial movement of said anchors through said slots outwardly of said case.

4. The combination of claim 1 wherein said end wall on said other end of said case is spaced longitudinally of said case away from said anchors a distance less than the combined length of said wedge and said enlarged head portion whereby the latter will abut the inner surfaces of said end wall before said wedge can be completely withdrawn from between said anchors thereby insuring that said wedge may not be accidentally withdrawn from between said anchors.

References Cited in the file of this patent

UNITED STATES PATENTS

| | | |
|---|---|---|
| 1,021,794 | Pleister | Apr. 2, 1912 |
| 1,234,487 | Raeger | July 24, 1917 |
| 2,376,279 | Schlenkert | May 15, 1945 |